United States Patent Office 3,232,990
Patented Feb. 1, 1966

3,232,990
PROCESS FOR N,N-DIALKYLHYDROXYLAMINES
Thomas E. Deger, Ambler, and Harry E. Albert, Lafayette Hill, Pa., assignors to Pennsalt Chemicals Corporation, Philadelphia, Pa., a corporation of Pennsylvania
No Drawing. Filed June 13, 1962, Ser. No. 202,081
10 Claims. (Cl. 260—583)

This invention relates to an improved process for the preparation of N,N-dialkylhydroxylamines, and is particularly concerned with an improved pyrolytic process for obtaining N,N-dialkylhydroxylamines from trialkylamine oxides. N,N-dialylhydroxylamines are compounds useful to prevent the premature polymerization of styrene as disclosed in U.S. 2,965,685.

It is known that trialkylamine oxides may be pyrolyzed to N,N-dialkylhydroxylamines (A. C. Cope and H. Lee, J. Am. Chem. Soc., 79, 964, 1957). The pyrolysis is performed by heating a concentrated aqueous solution of the trialkylamine oxide at temperatures above about 100° C. which thermally dissociates the amine oxide to N,N-dialkylhydroxylamine, olefin, and unknown by-products. Although the procedure is relatively simple, it is beset with difficulties, particularly in that conversions and yields are relatively low and also in that the by-products of the reaction which remain behind are pyrophoric and extremely hazardous. For example, as the pyrolysis is carried out, solid residues remain which are exothermic and which frequently explode. Because of these difficulties the prior art pyrolysis procedure is not susceptible to scale-up and commercialization.

It has now been found that trialkylamine oxides may be pyrolyzed to N,N-dialkylhydroxylamines in excellent yields and without the attendant hazards of the prior art processes. The improvement is achieved, in accordance with this invention, by bringing the amine oxide into a direct heat exchange relationship with an inert liquid held at the pyrolysis temperature, whereby the amine oxide is thermally converted to N,N-dialkylhydroxylamine, and the product thus formed volatilized from the reaction zone.

In one embodiment, the invention is carried out by providing a heated reaction vessel equipped with an agitator, a top inlet, a vapor outlet fitted with a distillation column and receiver, and a bottom liquid draw-off outlet, placing the inert liquid in the vessel, agitating and heating it to pyrolysis temperature, dropping a concentrated aqueous solution of the trialkylamine oxide into direct contact with the liquid and collecting the vaporized N,N-dialkylhydroxylamine product in the cooled distillation receiver. As the reaction proceeds the solid and tar-like by-products which form and which remain behind are dispersed or emulsified in the inert liquid and when the concentration of by-product in the inert liquid becomes high the process may be briefly terminated to permit by-product dispersion to concentrate at the bottom and be drawn off through the bottom outlet. Fresh inert liquid is then added to the reactor and the process may continue for another cycle.

Alternatively, the inert liquid may be constantly withdrawn, the insolubles separated and fresh inert liquid recirculated to provide a continuous process.

The by-product residue removed from the process consists of the inert liquid containing the by-product solids and tars. This material may be allowed to settle further and inert liquid recovered by decantation or by centrifugation techniques. The waste remaining is simple, drummed and disposed without difficulty or danger.

The process is operative at atmospheric pressure, but is preferably carried out under reduced pressure so that lower temperatures may be used and so that the product is quickly removed from the reaction zone. In the absence of reduced pressures, the dialkylhydroxylamine product tends to dissolve in the inert liquid and yields may be significantly lowered. For this reason, pressures no higher than about 75 mm. Hg will preferably be employed, for above such pressures the yields are often lowered somewhat. It will be understood, however, that with those inert liquids in which the dialkylhydroxylamine has poor solubility, higher pressures may be used without a significant yield loss. It will also be understood that the pressures used will be dependent upon the condensing efficiency of the recovery system. With diethylhydroxylamine as product and ice water cooling, about 60 to 75 mm. Hg pressure is preferred, but with more efficient cooling media such as brine or even liquid nitrogen, pressures as low as about 1 mm. Hg can be employed.

The pyrolysis temperature is, of course, independent of the pressure used. Pyrolysis of the amine oxides begins at about 85° C. and for making diethylhydroxylamine the process is preferably carried out over the range of about 100° to 125° C. Above about 135° C. the decomposition of the amine oxides is extremely fast and results in large amounts of tar formation.

The volatile N,N-dialkylhydroxylamine is removed from the reaction vessel together with water vapor and with the olefin formed from the reaction. The product is condensed and due to the solubility characteristics of N,N-dialkylhydroxylamines, usually separates into two layers. The upper layer is highly concentrated dialkylhydroxylamine product containing water and the lower layer is a less concentrated aqueous solution of the product. These layers are separated and the lower layer may be salted in the usual manner to recover additional product.

In general the process of this invention will give N,N-dialkylhydroxylamine product in high yields, being on the order of 85% and above. The product obtained will be an aqueous concentrated solution of active ingredient which is practically water-white and which may be used directly without further concentration or work-up.

The by-product olefin obtained by the displacement of an alkyl group during the pyrolysis may be separated and condensed for use or sale and thus the process provides an economic advantage in permitting recovery of a valuable by-product.

The inert liquid which will be employed in the process of this invention may be any substance boiling above about 250° C. at atmospheric pressure which is liquid at the reaction temperature and which is inert to the reactants and products. Preferably the inert liquid will be selected from the class consisting of aliphatic, aromatic and halogenated aliphatic and aromatic hydrocarbons, glycols, glycol ethers, aliphatic and aromatic carboxylic acid esters, organic silicates, and silicones. Specific examples of such inert liquids include hydrocarbon and paraffin oils, kerosene, mineral oil, heavy aromatic naphtha, triethylene glycol, tripropylene glycol, polyethylene glycol, the dibutylether of diethyleneglycol, dioctyl phthalate, sucrose octaacetate, ethyl 3-formyl-2,5-endomethylene-3-cyclohexanecarboxylate, tetra (2-ethylhexyl) silicate, and the like.

The process of this invention is particularly useful to make N,N-dialkylhydroxylamines containing one to six carbon atoms in each alkyl group, e.g. compounds of structure

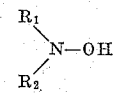

where $R_1$ $R_2$ are methyl, ethyl, propyl, butyl, amyl and hexyl radicals and they may be the same or different.

The R radicals may also be joined to form a ring as in N-hydroxypiperidine. To obtain N,N-dialkylhydroxylamines where $R_1$ and $R_2$ are different, the trialkylamine oxide used will be one having different alkyl groups, e.g., diethyl-methylamine oxide, methyl-ethyl-butylamine oxide, etc. It will be understood that the process of this invention may also be used to prepare N,N-dialkylhydroxylamines where $R_1$ and $R_2$ contain more than six carbon atoms, it being required only that a reaction temperature and pressure be employed so that the product can be volatilized from the reaction vessel whereby it is separated from the pyrolysis residue which remains behind. Thus, for example, the starting amine oxides may be those where the alkyl radicals are n-$C_7H_{15}$, octyl, decyl, dodecyl and the like.

The trialkylamine oxide starting materials are readily obtainable by the peroxide oxidation of the appropriate tertiary alkylamine as disclosed, for example, by Fieser and Fieser, "Organic Chemistry," D. C. Heath & Co., 1949, page 240. It will be understood that the reaction requires at least one alkyl group of the amine oxide to contain at least two carbon atoms so that an olefin may be eliminated. The amine oxide is employed as an aqueous solution and although the concentration of the amine oxide solution is not critical, a concentrate of about 70% to 85% by weight of amine oxide will be used for convenience and to keep the water content of the product at a minimum.

*Example 1*

A 1-liter three neck flask was provided with a stirrer, a thermometer well, an addition funnel and a distilling head which was connected to a water cooled condenser and a receiver for the product. Agitation was started and 200 g. of a paraffin oil boiling over the range of 332° to 455° C. (Topaz Oil B) was placed in the flask and the system was then evacuated to a pressure of about 75 mm. Hg. Heating by an electric mantel was started and when a temperature in the desired pyrolysis range (107–111° C.) was reached, an approximately 80% by weight aqueous solution of triethylamine oxide was slowly added. The rate of addition was controlled so that 411 grams of triethylamine oxide was added in 2.5 hours. After completion of the addition, the heating at 108–111° C. was continued for 20 minutes. The product in the receiver consisted of 270.6 grams of an upper layer containing 91.3% diethylhydroxylamine and 17.6 grams of a lower aqueous layer containing 41.3% diethylhydroxylamine.

*Example 2*

The equipment described in Example 1 was charged with 200 g. of a paraffin boiling over the range of 343° to 427° C. (Topaz Oil A). At a temperature of 105–108° C. and pressure of 65–79 mm. Hg, 691 g. of approximately 80–85% triethylamine oxide solution was pyrolyzed as in Example 1 to produce in the receiver a top layer containing 462.9 g. containing 88.9% diethylhydroxylamine and a bottom layer of 39.2 g. containing 42.2% diethylhydroxylamine. The pyrolysis residue which weighed 50.2 g. was dispersed throughout the oil and was easily and safely handled.

*Example 3*

In like manner the pyrolysis vessel was charged with 200 g. of a paraffin oil boiling over the range of 343° to 427 C. (Diamond B Oil). At a temperature of 105–110° C. and pressure of 65–79 mm., 500 g. of an 80–85% solution of triethylamine oxide was pyrolyzed. The recovery vessel contained a top layer of 321.5 g. containing 88.7% of diethylhydroxylamine and a bottom layer which was saturated with sodium chloride to recover 11.3 g. of an additional oil layer containing 94.8% diethylhydroxylamine. The pyrolysis residue recovered from its dispersion weighed 23 g. and was easily handled.

*Example 4*

As in Example 1, the pyrolysis vessel was charged with 200 g. of a chlorinated diphenyl boiling at 340° to 375° C. (Arachlor No. 1248). At a temperature of 105–110° C. and pressure of 70–75 mm., 750 g. of triethylamine oxide solution (approx. 80–85%) was pyrolyzed as in the previous examples to produce in the receiver 504 g. of top layer containing 88.4% diethylhydroxylamine and 37.3 g. lower layer containing 32% diethylhydroxylamine. The pyrolysis residue was 58.7 g.

*Example 5*

In like manner the pyrolysis vessel was charged with 200 g. of a polyethylene glycol having a molecular weight range of 180 to 200 and having a flash point 171° C. At a temperature range of 105–112° C. and pressure of 65–75 mm., 500 g. of 75.22% triethylamine oxide solution was pyrolyzed to give in the receiver 192.5 g. of a top layer containing 87.9% diethylhydroxylamine and a bottom layer of 62.5 g. The bottom layer was saturated with sodium chloride to give a top layer of 17 g. containing 93.7% diethylhydroxylamine. Further heating of the pyrolysis reaction mixture to 135° C. at 75 mm. gave 67.5 g. more of 97.8% diethylhydroxylamine. Yield of diethylhydroxylamine was 87.8% based on triethylamine oxide.

*Example 6*

As in the above examples the pyrolysis vessel was charged with 188 g. of the dibutylether of diethyleneglycol ($C_4H_9OCH_2CH_2OCH_2CH_2OC_4H_9$, boiling point 254.6° C.). At a temperature range of 105–110° C. and pressure of 65–75 mm., 500 g. of triethylamine oxide solution (80–85%) was pyrolyzed to give in the receiver 302.5 g. top layer (85.6% diethylhydroxylamine) and 48 g. bottom layer. Saturation of the bottom layer with sodium chloride gave 11 g. of 97% diethylhydroxylamine. Pyrolysis residue weight was 51.5 g. Further heating of the carbitol and residue gave 30 g. more of 88.5% diethylhydroxylamine.

*Example 7*

In like manner the pyrolysis vessel was charged with 400 ml. of paraffin oil (U.S.P. white, approximate boiling range=330–390° C.). At a temperature of 115–136° C. and a pressure of 65–80 mm., 207 g. of triethylamine oxide solution (80–85%) was pyrolyzed to give in the receiver 116 g. of top layer (88.7% diethylhydroxylamine) and 18.4 g. of bottom layer (29.2% diethylhydroxylamine). The pyrolysis residue weight was 31.2 g.

*Example 8*

Pyrolysis was carried out as in Example 6 with 200 g. of dioctyl phthalate as inert liquid. The product receiver contained 272.5 g. top layer (88.2% diethylhydroxylamine) and 60.5 g. bottom layer. Saturation of the bottom layer with sodium chloride gave 12.2 g. of 94.2% diethylhydroxylamine. The pyrolysis residue was 67 g. Further heating of the mixture of dioctyl phthalate and residue at 75 mm. to a temperature of 125° C. gave 24.8 g. more of 94.9% diethylhydroxylamine. Yield of N,N-diethylhydroxylamine was 96.4% based on triethylamine oxide.

*Example 9*

The reactor consisted of a 25 gal. glass lined, steel, steam jacketed, stirred vessel fitted with a line for addition of the triethylamine oxide solution and a vapor exit line leading through a condenser into the product receiver. The reactor was charged with 50 lbs. of the paraffin oil used in Example 1. While maintaining a temperature of 105° C. and a pressure of 75 mm. Hg, the triethylamine oxide solution was added at a rate of 20 to 30 lbs./hr. Product was collected continuously in the receiver. In this manner 250 lbs. of a 74.5% triethyl amine oxide solution was pyrolyzed to give 129.7 lbs.

(88.45% diethylhydroxylamine) top layer in the receiver and 31.5 lbs. (34.2% diethylhydroxylamine) as bottom layer. After stopping the stirrer a black tar residue of 26 lbs. settled to the bottom and was easily drained from a bottom valve on the reactor. The residue was disposed without any evidence of pyrophoric properties. Yield of N,N-diethylhydroxylamine was 88.3% based on triethylamine oxide.

*Example 10*

Di-n-butylhydroxylamine is prepared from tri-n-butylamine oxide by a pyrolysis procedure essentially the same as that used in Example 9. Likewise, N.N-di-n-hexylhydroxylamine is obtained from tri-n-hexylamine oxide by similar pyrolysis using a silicone oil whereby the by-products are easily and safely handled.

It will be understood that numerous changes and variations may be made from the above description and examples without departing from the spirit and scope of the invention.

We claim:

1. In the process of pyrolyzing a trialkylamine oxide to an N,N-dialkylhydroxylamine wherein the alkyl groups of said hydroxylamine contain from 1 to 12 carbon atoms, the improvement which comprises bringing said amine oxide in direct heat exchange relationship with an inert liquid boiling above about 250° C. and selected from the class consisting of paraffin oil, kerosene, mineral oil, heavy aromatic naphtha, triethylene glycol, tripropylene, polyethylene glycol, the dibutylether of diethylene glycol, chlorinated biphenyl, dioctylphthalate, sucrose octaacetate, ethyl-3-formyl-2, 5-endomethylene-3 - cyclohexane-carboxylate, and tetra(2-ethylhexyl)silicate, held at a temperature between about 85° C. and about 135° C. and removing said dialkylhydroxylamine product from the reaction zone.

2. In the process of pyrolyzing a trialkylamine oxide to an N,N-dialkylhydroxylamine wherein the alkyl groups of said hydroxylamine contain from 1 to 6 carbon atoms, the improvement which comprises effecting said pyrolysis by contacting said amine oxide with an inert liquid boiling above about 250° C. and selected from the class consisting of paraffin oil, kerosene, mineral oil, heavy aromatic naphtha, triethylene glycol, tripropylene glycol, polyethylene glycol, the dibutylether of diethylene glycol, chlorinated biphenyl, dioctylphthalate, sucrose octaacetate, ethyl-3-formyl-2,5 - endomethylene-3 - cyclohexane-carboxylate, and tetra(2-ethylhexyl)silicate, said inert liquid being held at a temperature between about 85° C. and about 135° C. and removing vapors of said hydroxylamine product from the reaction zone.

3. In the process of pyrolyzing a trialkylamine oxide to an N,N-dialkylhydroxylamine wherein the alkyl groups of said hydroxylamine contain from 1 to 6 carbon atoms, the improvement which comprises effecting said pyrolysis at lower than atmospheric pressure by contacting said amine oxide with an inert liquid boiling above about 250° C. and selected from the class consisting of paraffin oil, kerosene, mineral oil, heavy aromatic naphtha, triethylene glycol, tripropylene glycol, polyethylene glycol, the dibutylether of diethylene glycol, chlorinated biphenyl, dioctylphthalate, sucrose octaacetate, ethyl-3-formyl-2,5-endomethylene-3-cyclohexane-carboxylate, and tetra-(2-ethylhexyl)silicate, said inert liquid being held at a temperature between about 85° C. and about 135° C. and removing vapors of said hydroxylamine product from the reaction zone.

4. The process of claim 3 wherein the inert liquid is paraffin oil.

5. The process of claim 3 wherein the inert liquid is chlorinated diphenyl.

6. The process of claim 3 wherein the amine oxide is triethylamine oxide.

7. The process of claim 3 wherein the amine oxide is triethylamine oxide and the inert liquid is paraffin oil.

8. The process of claim 3 wherein the inert liquid is polyethylene glycol.

9. The process of claim 3 wherein the inert liquid is dibutylether of diethylene glycol.

10. The process of claim 3 wherein the inert liquid is dioctyl phthalate.

References Cited by the Examiner

UNITED STATES PATENTS

| | | | |
|---|---|---|---|
| 2,810,681 | 10/1957 | Nadler | 202—57 |
| 2,884,362 | 4/1958 | Bloom et al. | 202—57 |

OTHER REFERENCES

Cope et al., Jour. Am. Chem. Soc., vol. 59 (1957), pp. 964–5.

CHARLES B. PARKER, *Primary Examiner.*